(12) United States Patent
Huang et al.

(10) Patent No.: US 11,714,304 B2
(45) Date of Patent: Aug. 1, 2023

(54) HELMET WITH DIGITAL VISOR

(71) Applicant: Robert Bosch GmbH, Stuttgart (DE)

(72) Inventors: Xinyu Huang, Cupertino, CA (US); Benzun Pious Wisely Babu, San Jose, CA (US); Liu Ren, Saratoga, CA (US)

(73) Assignee: Robert Bosch GMBH, Stuttgart (DE)

( * ) Notice: Subject to any disclaimer, the term of this patent is extended or adjusted under 35 U.S.C. 154(b) by 0 days.

(21) Appl. No.: 17/181,208

(22) Filed: Feb. 22, 2021

(65) Prior Publication Data

US 2022/0269122 A1    Aug. 25, 2022

(51) Int. Cl.
*G02F 1/133* (2006.01)
*A42B 3/04* (2006.01)
*G02B 27/00* (2006.01)
*G02F 1/137* (2006.01)

(52) U.S. Cl.
CPC .......... *G02F 1/13312* (2021.01); *A42B 3/042* (2013.01); *G02B 27/0093* (2013.01); *G02F 1/137* (2013.01)

(58) Field of Classification Search
CPC ..... G02F 1/13312; G02F 1/137; A42B 3/042; G02B 27/0093
See application file for complete search history.

(56) References Cited

U.S. PATENT DOCUMENTS

| | | | |
|---|---|---|---|
| 2020/0111259 A1* | 4/2020 | Sears | G02B 27/0172 |
| 2021/0054691 A1* | 2/2021 | Ramirez | B60K 35/00 |
| 2021/0071473 A1* | 3/2021 | Kwon | B60J 3/0204 |
| 2021/0145644 A1* | 5/2021 | Billingsley | G02F 1/13312 |
| 2021/0257084 A1* | 8/2021 | Freeman | A42B 3/228 |

* cited by examiner

*Primary Examiner* — Nathanael R Briggs
(74) *Attorney, Agent, or Firm* — Dickinson Wright PLLC (57) ABSTRACT

A helmet and a method and system for controlling a digital visor of a helmet are disclosed herein. The helmet includes a visor screen having a plurality of liquid crystal display (LCD) pixels, with each LCD pixel configured to alter in transparency. The helmet also includes a light sensor configured to detect incident light. The helmet also includes a controller coupled to the visor screen and the light sensor. The controller is configured to alter the transparency of the plurality of LCD pixels based on the incident light. In embodiments, the controller can alter the transparency of the LCD pixels based on the direction and/or intensity of the incident light.

10 Claims, 6 Drawing Sheets

HELMET WITH DIGITAL VISOR

TECHNICAL FIELD

The present disclosure relates to a helmet having a digital visor.

BACKGROUND

Motorcycle helmets typically have a face shield for covering and protecting the eyes of the rider. Many common motorcycle helmets provide an option to tint the face shield to reduce the amount of sunlight traveling directly to the rider's eyes. Some helmets have a tinted sun visor that can be flipped down to cover the face shield. In some helmet models, the visor is built into the helmet as a secondary shield that can be deployed. In some cases, it can be deployed by using a button on the helmet. As another option, some helmets have a tinting feature manufactured into the face shield itself.

SUMMARY

According to one embodiment, a helmet includes a visor screen having a plurality of liquid crystal display (LCD) pixels, each LCD pixel configured to alter in transparency. The helmet also includes a light sensor configured to detect incident light. The helmet also includes a controller coupled to the visor screen and the light sensor, the controller configured to alter the transparency of the plurality of LCD pixels based on the incident light.

According to another embodiment, a method for controlling a digital visor of a helmet includes detecting a direction of incident light via a light sensor associated with the helmet. The method also includes based on the direction of incident light, darkening a digital visor of a helmet by reducing a transparency of at least a group of a plurality of liquid crystal display (LCD) pixels of the digital visor.

According to another embodiment, a system for controlling an electronic visor screen of a helmet includes a visor screen configured to shield eyes of a helmet wearer, the visor screen having a plurality of liquid crystal display (LCD) pixels, each LCD pixel configured to (i) in an opaque state, block light from passing through a corresponding area of the visor screen, and (ii) in a transparent state, allow light to pass through the corresponding area of the visor screen. The system also includes a light sensor configured to mount to a helmet and detect a direction of incident light. The system also includes a controller configured to transition a group of the LCD pixels from the transparent state to the opaque state, where the group is selected for the transition by the controller based on the direction of incident light.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Motorcycle helmets typically have a face shield for covering and protecting the eyes of the rider. Many common motorcycle helmets provide an option to tint the face shield to reduce the amount of sunlight traveling directly to the rider's eyes. Some helmets have a tinted sun visor that can be flipped down to cover the face shield. In some helmet models, the visor is built into the helmet as a secondary shield that can be deployed. In some cases, it can be deployed by using a button on the helmet. As another option, some helmets have a tinting feature manufactured into the face shield itself.

The use of these visors can be cumbersome during operation, and may require the rider to remove his hand from the handlebar of the motorcycle to deploy or flip down the sun visor. This can be dangerous. Moreover, even when the visor is flipped down or deployed to protect the rider's eyes, it may darken more of the field of view than is necessary. This may undesirably tint or darken the entire environment as viewed through the face shield, when direct sunlight may be coming through only a certain region of the face shield.

Therefore, according to various embodiments described herein, a motorcycle helmet is provided with a digital visor. The digital visor includes pixels that can be controlled electronically to change their level of transparency. Sensors such as a camera, ambient light sensor, eye tracker, and the like on the helmet or the motorcycle can be used to control the visor tinting. For example, one or more sensors can locate the direction of the sun or bright sunlight relative to the helmet, increase the opaqueness of the pixels in a correspondingly area of the digital visor that will block the detected light from traveling directly into the rider's eyes. Additional description is provided below with reference to Figures.

Figure 1:
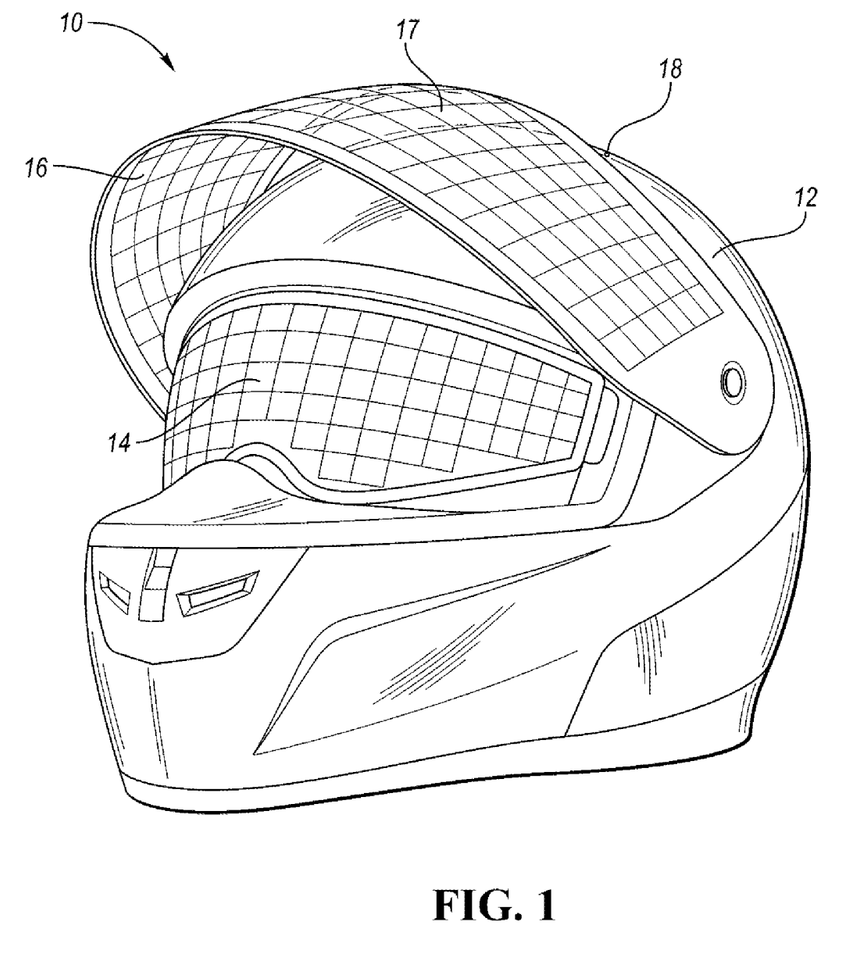
FIG. 1 is a perspective view of a helmet having a digital visor, according to one embodiment.

FIG. 1 illustrates a helmet 10 according to one embodiment. The helmet may be a motorcycle helmet or bike helmet, although the teachings of the present disclosure are not limited to such a helmet. The helmet may also be an aviation (pilot) helmet, or a helmet for an all-terrain vehicle (ATV) driver, dirt bike driver, dual sport driver, race car driver (e.g., NASCAR, INDYCAR, etc.) and the like.

The helmet 10 includes a rigid outer shell 12 that may contain padding, impact-absorbing liners or structures, and electronics. The helmet also includes a face shield 14 configured to shield the face and eyes of the wearer. The face shield 14 may be fixed or otherwise rigidly attached with respect to the outer shell 12 such that it is not moveable relative to the remainder of the helmet. In other words, the face shield 14 is a permanent shield meant for covering the eyes of the wearer at all times when worn. Of course, in other embodiments the face shield 14 may be moveable. The face shield 14 may, for example, be removably attached, or able to slide up or down within the interior of the outer shell 12.

The helmet 10 also includes a protective visor 16. The visor 16 of this embodiment is a flip-down visor that is able to flip or fold down to cover the face shield 14. The visor 16 is shown in FIG. 1 in a non-use position, folded up and out of sight of the wearer wearing the helmet 10. The visor 16 can be shaded or tinted such that, when folded down to cover the face shield 14 or eyes of the wearer, it reduces sunlight or glare for the wearer's eyes.

Either one or both of the face shield 14 and/or visor 16 may be equipped with a digital screen. The embodiment shown in FIG. 1 illustrates both the face shield 14 and visor 16 having a digital screen, represented by the grid of pixels 17 shown. Of course, the grid of pixels 17 may not be to scale, and may be enlarged for illustrative purposes. Each square pixel 17 may be a group of individual pixels 17. Moreover, in FIG. 1, both the face shield 14 and visor 16 are shown having a digital screen of pixels 17. This is merely illustrative, and of course either one or both of the face shield 14 and/or visor 16 may include the digital capabilities described herein. Therefore, for the purposes of this disclosure, references made to a "digital visor" or a "visor screen" may refer to either the face shield 14 or visor 16 being equipped with the digital capabilities described herein. In other words, the term "digital visor" can be fixed with respect to the helmet 10 like the face shield 14 of FIG. 1, or may be moveable relative to the helmet 10 like the flip-down visor 16 of FIG. 1.

Many known flip-down visors have a main purpose of providing shade to the helmet wearer. Therefore, the digital visor described herein can, in some embodiments, replace the flip-down visor altogether and instead incorporate digital shading techniques on the face shield 14 itself.

The digital visor, whether incorporated into the face shield 14 or visor 16, can be automatically controlled such that a first portion of the visor is transparent and a second portion of the visor is opaque or non-transparent. In embodiments, the digital visor or visor screen may be a liquid crystal display (LCD) screen, and the pixels 17 may be LCD pixels. Individual pixels 17 or regions within the visor screen can be commanded to be opaque to block the sunlight for the driver's eyes, while other regions of the visor screen may be transparent such that the field of view is maintained. In short, only a portion of the visor screen 14, 16 may be commanded to be opaque, while the remainder of the visor screen 14, 16 is commanded to be translucent.

To do so, the helmet 10 is equipped with a light sensor 18 configured to detect incident light. The light sensor 18 may be mounted or otherwise attached within the helmet 10 at a position where it can detect the ambient or incident light, such as at the crown or top of the helmet 10. The light sensor 18 can detect and measure both the intensity and the direction of ambient light. In embodiments, the light sensor 18 utilizes collimators or polarizers to determine the direction of the incident light source relative to the light sensor. In embodiments, the light sensor 18 has external directional components used for calibration based on the relative position of the reference light source. Collimators, in connection with position sensitive light detectors, are used to collect information on the amount of electric charge induced in one or more electrodes by a collimated light beam. The information from the electrodes is used to derive a direction of incidence of the light. In embodiments, the light sensor 18 implements light detectors distributed over a spherical (e.g., hemispherical) surface to determine the direction of incident light based on which light detectors are activated by the incident light. In embodiments, the light sensor 18 uses polarization filters to uniquely polarize light from different directions to detect the direction of incident light based on the type of polarization detected. Alternatively, the light sensor 18 includes dielectric layer (or stack of dielectric layers), a plurality of photo detectors coupled relative to the dielectric layer, and a plurality of stacks of opaque slats embedded within the dielectric layer, wherein the dielectric layer is substantially transparent to the incident light, the photo detectors detect the incident light through the dielectric layer, and the stacks of opaque slats are approximately parallel to an interface between the dielectric layer and the photo detectors. The stacks of opaque slats define light apertures between adjacent stacks of opaque slats, and at least some of the stacks of opaque slats are arranged at a non-zero angle relative to other stacks of the opaque slats. In short, the light sensor is configured to detect and measure both the intensity and the direction of incident light, and the light sensor may take one of a variety of structural forms to do so.

Figure 2A:
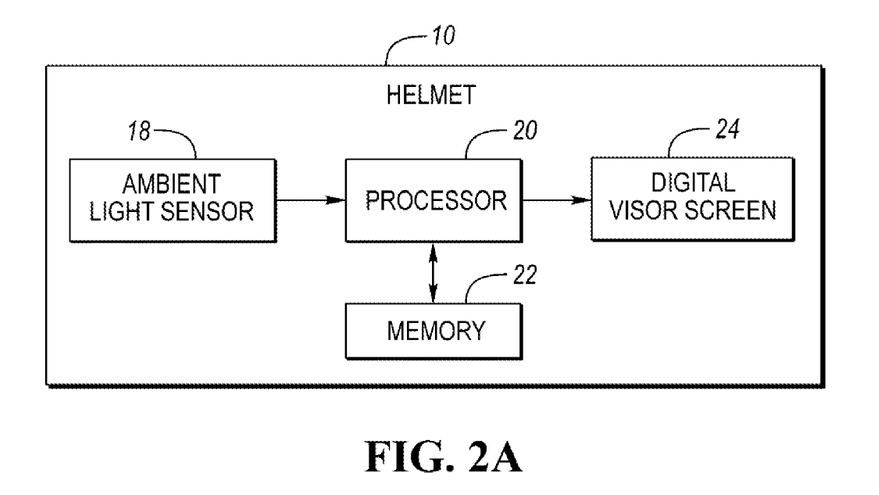
FIG. 2A is an example of a system design for a helmet that allows control of a digital visor according to one embodiment.
Figure 2B:
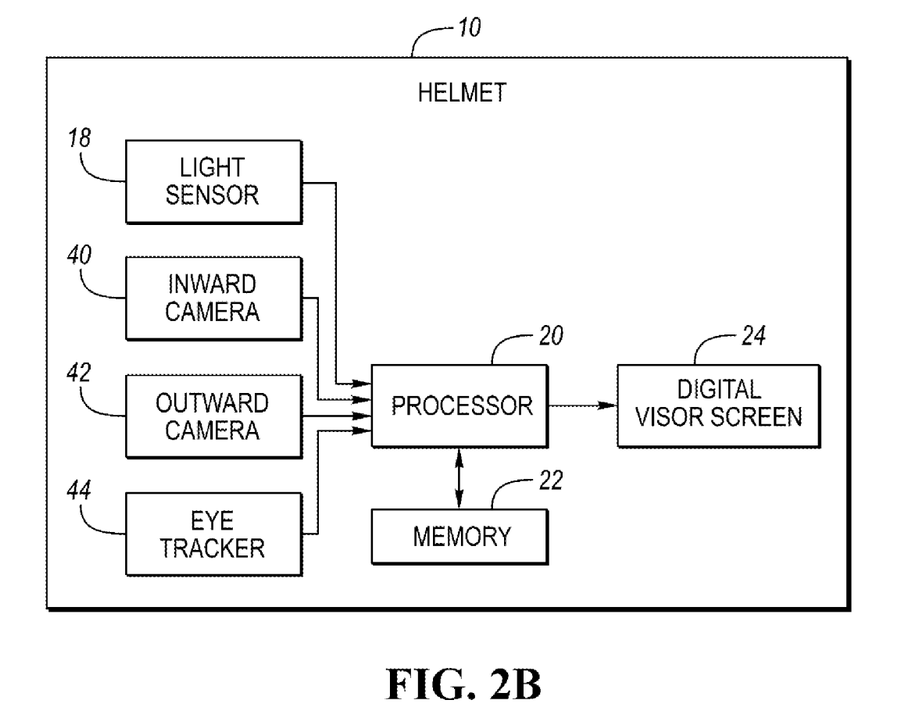
FIG. 2B is an example of a system design for a helmet that allows control of a digital visor according to another embodiment.

FIGS. 2A-2B show flow charts or system diagrams of embodiments of control of the visor screen of the helmet. Referring to the embodiment of FIG. 2A along with FIG. 1, the helmet 10 includes the light sensor 18. Signals output by the light sensor 18 is delivered to a processor 20. The processor is communicatively coupled to the light sensor 18, as well as memory (or storage) 22 and the digital visor screen 24 (which may incorporated into the face shield 14 and/or visor 16). The processor 20 is programmed to execute instructions stored in the memory 22 for altering the translucence or opaqueness of the digital visor screen 24. In particular, the screen 24 may be a liquid crystal display (LCD) screen having a plurality of independently operable LCD pixels and/or LCD shutters arranged in a grid formation. Each pixel is configured to be selectively operated by the processor 20 in one of at least two optical states: (1) an opaque state, in which the respective pixel blocks light from passing through a respective area of the screen 24 and (2) a transparent state, in which the respective pixel allows light to pass through the respective area of the screen 24. It will be appreciated, however, that any number of intermediate optical states may also be possible. As the processor 20 acts in this fashion to control the screen 24, the processor 20 may also be referred to as a "controller," or may be connected to a separate controller that physically performs the action of controlling the pixels of the screen 24. Furthermore, the opaque state and the transparent state do not necessarily indicate a 100% opaque characteristic and a 100% transparent characteristic, respectively. Instead, the opaque state is simply one which blocks more light from passing through the respective area than does the transparent state. It will be appreciated that the screen 24 may instead utilize technology other the LCD pixels and a shutter screen may utilize any type of panel having shutter pixels that are electrically, magnetically, and/or mechanically controllable to adjust an optical transparency thereof. For example, the screen 24 may be include a grid of light emitting diodes (LED) that can be controlled to be off (e.g., transparent) and on (e.g., darkened color such as black).

If the screen 24 is an LCD screen operable by the processor 20, the screen 24 may operate as follows, according to an embodiment. The screen itself may comprise a thin layer of glass with liquid crystals, with a white illumination system is placed right behind the glass. Each single pixel may be composed by multiple (e.g., three) "subpixels", each one able to produce a different color, such as red, blue and green. When activated by an electric current, the subpixels work as "shutters". Depending on the intensity of the current, pixels will become more or less "closed". This blocking—or partial blocking—takes place in a perpendicular manner to the passage of light. The mix of those three layers creates the actual final color visible on the screen 24. Likewise, if all three subpixels are "open" (or "not colored"), the backlight will then travel through the subpixels with no alteration. The result is then a transparent dot in the region of the pixel. So, in order for a region to be transparent, the LCD pixels in that area are energized.

The screen 24 may also be an organic light-emitting diode (OLED) screen operable by the processor 20. In such an embodiment, the screen may include two layers of glass on both sides of a set of addressable LEDs with an emissive layer and a conductive layer. Electrical impulses travel through the conductive layer and produce light at the emissive layer. So, in order for a region to be transparent, the OLED screen is simply not energized. However, OLEDs have a difficulty in creating dark (e.g., black) colors that may be beneficial to effectively block out direct sunlight.

It should be understood that the examples provided above regarding LCD and OLED screens are merely examples of transparent displays that can be used as the digital visor screen 24. Other available technologies can also be utilized as the screen 24. As controlled by the processor 20 and instructions stored in memory, utilizing any of the exemplary screen technologies described herein the screen is configured to alter between (1) an opaque state, in which regions of the screen are opaque to block out at least a portion of the sunlight, and (2) a transparent state, in which the regions allow light to pass through the respective area of the screen 24.

The processor 20 may include one or more integrated circuits that implement the functionality of a central processing unit (CPU), display controller, and/or graphics processing unit (GPU). In some examples, the processor 20 is a system on a chip (SoC) that integrates the functionality of the CPU and GPU. The SoC may optionally include other components such as, for example, the storage 22 into a single integrated device. In other examples, the CPU and GPU are connected to each other via a peripheral connection device such as PCI express or other suitable peripheral data connection. In one example, the CPU is a commercially available central processing device that implements an instruction set such as one of the x86, ARM, Power, or MIPS instruction set families. The processor may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a field programmable gate array ("FPGA") or an application specific integrated circuit ("ASIC"). Such a special purpose circuit may be referred to as a computer processor even if it is not a general-purpose processor.

Regardless of the specifics, during operation, the processor 20 executes stored program instructions that are retrieved from memory or storage 22. The storage 22, when accessed by the processor 20, may be configured to enable execution of instructions to alter the translucence and/or opaqueness of one or more pixels 17 or regions of pixels 17 of the screen 24. The storage 22 may include a single memory device or a plurality of memory devices including, but not limited to, random access memory ("RAM"), volatile memory, non-volatile memory, static random-access memory ("SRAM"), dynamic random-access memory ("DRAM"), flash memory, cache memory, or any other device capable of storing information. The non-volatile memory includes solid-state memories, such as NAND flash memory, magnetic and optical storage media, or any other suitable data storage device that retains data when the digital visor screen 24 is deactivated or loses electrical power. Programs residing in the non-volatile storage may include or be part of an operating system or an application, and may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL. The volatile memory includes static and dynamic random-access memory (RAM) that stores program instructions and data during operation of the digital visor screen. The memory 22, when accessed by the processor 20, is configured to cause the processor 20 to alter the digital visor screen 24 by selecting one or more pixels 17 to adjust in transparency. The selection of the one or more pixels 17, along with the level of opaqueness or transparency commanded for that one or more pixels 17, is based on the signal received from the light sensor 18, such as the direction and magnitude of the incident light.

Figure 3A:
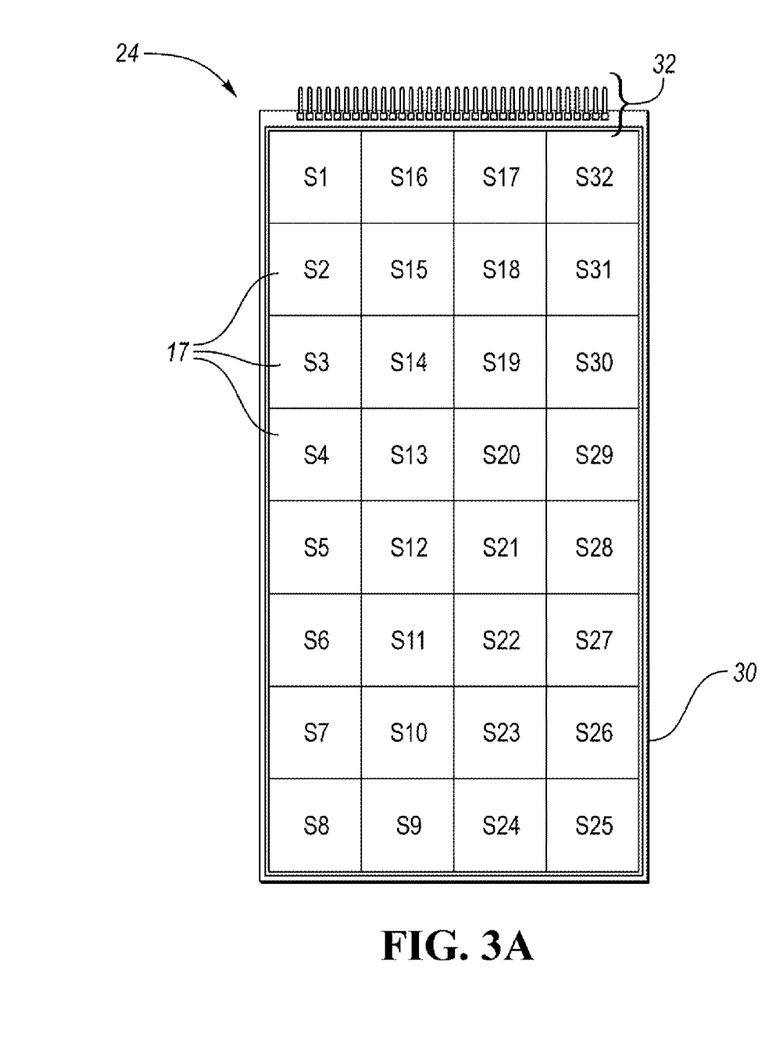
FIG. 3A is a simplified block diagram of at least a portion of a digital visor with the entire portion in a transparent state.
Figure 3B:
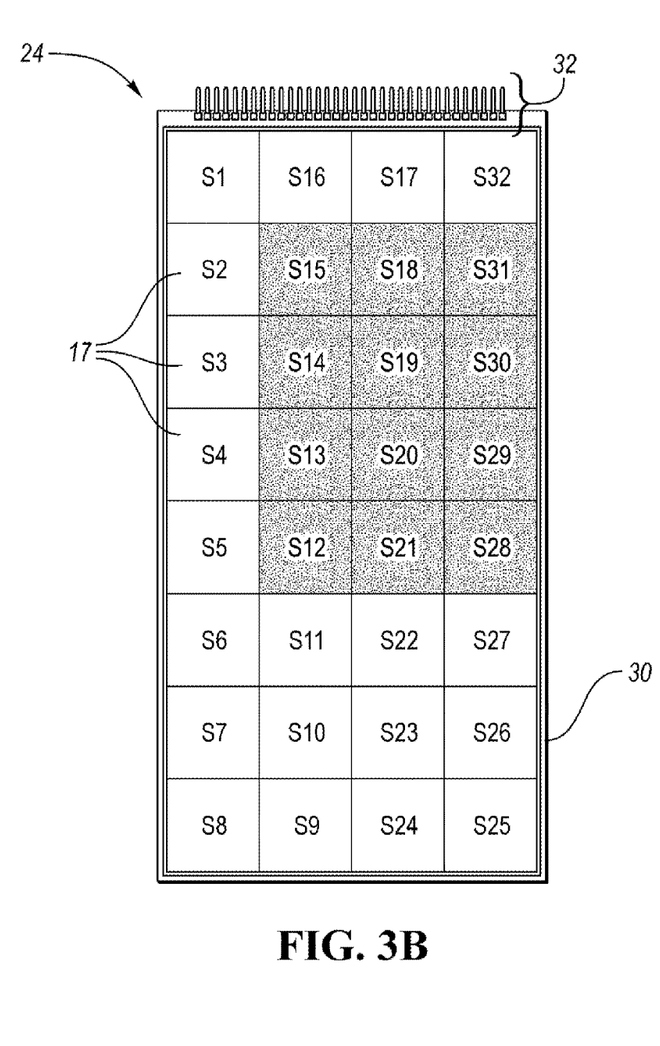
FIG. 3B shows the block diagram with an area of the portion opaque to block at least some light from passing through the area.

FIG. 3A is a simplified block diagram of the digital visor screen 24 in a transparent state, and FIG. 3B is a simplified block diagram of the screen 24 with a region of the screen 24 being in an opaque state. The visor screen 24 shown in these Figures may represent only a portion of the entire visor screen 24, and may not be to scale. For example, the screen 24 shown in these Figures has an array of thirty-two (32) pixels 17. However, in actuality, the entire visor screen 24 may include many more (e.g., hundreds or thousands) of pixels. The array of pixels 17 are arranged in a grid formation. In this embodiment, the grid of pixels includes pixels labeled S1-S32 arranged in four columns and eight rows (i.e., a 4×8 grid formation). However, it will be appreciated that the screen 24 may include any number of pixels 17 arranged in any suitable number of rows and columns. Additionally, the pixels can be arranged in non-rectangular and/or irregular formations having pixels of various shapes and sizes.

In at least one embodiment, the visor screen 16 includes a border or bezel 30 configured to surround and/or contain the array of pixels 17 (S1-S32) and to secure and/or hold the array of pixels 17 together. While the visor screen 24 may be an LCD screen having these pixels, of course in other embodiments the pixels and/or type of light source may vary. The pixels 17 may be connected to driver circuits that control individual pixels and/or rows or columns of pixels 17.

The visor screen 24 may also include an electronic connector 32 configured to connect the controller or processor 20 to the individual pixels 17 and/or to the driver circuits, connect the driver circuits to the individual pixels, and/or connect the visor screen 24 to a power source. The controller or processor 20 as well as the driver circuits can be configured to provide appropriate voltages, currents, data, and/or other signals to the visor screen 24 via the connector 32 to operate the pixels 17 and control the optical states thereof (i.e., control whether each pixel is in the opaque state or the transparent state). In some embodiments, certain data (e.g., an identification of which pixels are opaque and which are transparent) or other signals are transmitted back to the processor or controller 20 from the pixels 17 via the connector 32.

FIG. 3A shows the visor screen 24 with the entire array of pixels 17 in the transparent state. FIG. 3B shows the screen 24 with at least some of the pixels 32 (S12-S15, S18-S21 and S28-S31) in an opaque state. This opaque region of the visor screen 24 can correspond to the opaque regions in FIGS. 4-5 (which are described below). As explained above, this can be accomplished by controlling the pixels 17 such that they are opaque or "closed," and thus at least partially blocking light from the ambient light source (e.g., the sun) from transmitting therethrough.

The controller or processor 20 selects the regions of the visor screen 16 to transition from the transparent mode to the opaque mode while maintaining a reminder of the visor screen 16 in the transparent mode. This darkens a region of the visor screen 16 that will help shade the eyes of the helmet wearer while not darkening regions that are either not aligned with the incident light (e.g., sunlight) so as to not interfere with the field of view unnecessarily. This allows the visor screen 16 to be controlled to darken in particular, localized regions then will help shade the wearer's eyes without unnecessarily darkening the field of view.

The particular pixels 17 selected by the controller or processor 20 for darkening and/or the amount of darkening commanded by the controller or processor 20 can be made based on an input (e.g., the signals from the light sensor 18), or several inputs. FIG. 2A shows a simplified embodiment where the light sensor 18 acts as the main input for this selection, and FIG. 2B shows a more complex embodiment in which additional input capabilities are illustrated. For example, in the illustrated embodiment, the system or helmet 10 may include one or more of an inward camera 40, an outward camera 42, and an eye tracker.

The inward camera 40 may be mounted within the helmet 10 in a position such that it faces the face of the wearer when the helmet is worn. The inward camera 40 may be configured to detect an illumination level of at least one location of the face of the wearer, such as the eyes of the wearer. For example, the inward camera can monitor the changes of the shade applied to the wearer's face as the pixels 17 are transitioned from the transparent mode to the opaque mode. If, based on the direction of the incident light, the controller 20 commands a particular group of pixels 17 to darken, the inward camera 40 may detect changes in color of the wearer's face. To assure the proper shading is placed, the camera 40 and associated processor can assure the shade has been applied to a detected location of the eyes of the wearer. In other words, the inward camera 40 may act as a check on the system such that shade is maintained over the eyes of the wearer. If the selected pixels 17 for transitioning to the opaque mode do not place a shadow on a desired location such as over the eyes of the wearer as detected by the inward camera 40, the controller can select other pixels.

The inward camera 40 can also be used to control which pixels 17 are transitioned to the opaque mode upon activation of the digital visor screen system. In some embodiments, the controller 20 is configured to determine a baseline illumination level of at least one location of interest. In particular, the controller 20 may be configured to determine a baseline illumination level on the face of the wearer, or more particular, on the eyes of the wearer. The controller 20 may be configured to determine a change in the illumination level by comparing the illumination level in each image frame with the determined baseline illumination level, in order to determine whether each pixel of the visor screen 24 is to be operated in the opaque state or the transparent state. It will be appreciated that the baseline illumination level and the detected changes will vary depending on characteristics of the wearer, such as skin color, eye color, facial hair, facial features, and so forth, as well as what the wearer is wearing, such as sun glasses, eye glasses, or other light obstructing items. Additionally, it will be appreciated that the detected changes in the illumination level may be a result of a changing in the lighting environment or a change in optical state of one or more of the pixels of the visor screen 24.

The controller 20 may be configured to operate at least one pixel 17 of the visor screen 24 in the opaque state in response to the illumination level and/or the change in the illumination level of the at least one location of interest, as detected by the inward camera 40, exceeding a predetermined threshold. In at least one embodiment, the controller 20 is configured to operate at least one pixel 17 of the visor screen 24 in the opaque state in response to the illumination level and/or the change in the illumination level on the face of the helmet wearer exceeding the predetermined threshold or, more particularly, in response to the illumination level and/or the change in the illumination level on the eyes of the wearer exceeding the predetermined threshold.

The controller 20 may configured to select the at least one pixel of the visor screen 24 to be operated in the opaque state so as to block light shining on the at least one location of interest. Particularly, in at least one embodiment, the controller 20 is configured to select at least one pixel 17 of the visor screen 24 to be operated in the opaque state so as to block light shining on the face of the wearer, or more particularly, on the eyes of the wearer. In this way, the controller 20 is configured to operate the pixels 17 of the visor screen 24 to reduce the illumination level at the at least one location of interest, such as the face and/or the eyes of the wearer as detected by the camera 40.

The outward camera 42 may be utilized along with or in place of the light sensor 18. The outward camera 42 may be configured to detect the location of incident light, e.g., the location of the sun or a sunlight reflection. Various embodiments are contemplated to detect incident sunlight from the outward camera 42. For example, a regression function that maps the intensity distribution from a captured image to the sunlight direction could be implemented. Based on the detected location of the sun or incident light relative to the helmet 10, the controller 20 can select one or more of the pixels 17 for transitioning to the opaque mode (or becoming more opaque). The selected pixels 17 can correspond to the location of the incident light. For example, if the incident light is detected as being located forward of the wearer and to the right, then the pixels 17 selected for darkening may be located in the upper right corner of the visor screen 24 (from the perspective of the wearer). This sort of process can also be utilized in the embodiment illustrated in FIG. 2A in which a light sensor 18 is utilized for determine the location and/or intensity of the incident light.

The helmet 10 or control system may also include an eye tracker 44. The eye tracker 44 may be a subsystem configured to detect and track the location of the eyes of the wearer. The eye tracker subsystem 44 may include a camera such as the inward camera 40. The eye tracker 44 may also include a projector configured to create a pattern of near-infrared light on the eyes of the wearer. The camera of the eye tracker can take high-resolution images of the wearer's eyes and the pattern projected on the eyes. Machine learning, image processing, and/or mathematical algorithms can then be used to determine the eyes' position and gaze point. The eye tracker can thus determine not only the location of the eyes, but where the eyes are looking. Based on this information, the processor 20 can select one or more of the pixels 17 for darkening that will be aligned with the direction of where the wearer's eyes are looking. As the driver looks or gazes to different locations, the visor screen 24 can correspondingly darken the pixels 17 that are aligned with the area that the wearer is looking while maintaining the remaining pixels in the transparent state.

In embodiments in which an inward camera 40 is utilized, facial recognition or eye detection can dictate which pixels are darkened. In one embodiment, image data from the images captured by the camera 40 is analyzed for facial recognition, which can include face detection, face alignment, 3D reconstruction, and the like. For example, the storage 22 may include a facial recognition model, or other similar model. The facial recognition model can be, for example, OpenFace or similar available machine learning model. The model may be a pre-trained model from, for example, DLIB or OpenCV. The image can first be analyzed for detecting a face and placing a bounding box about the face. The detected face can be transformed for a neural network. For example, in OpenFace, DLIB's real-time pose estimation is used with OpenCV's affine transformation to try to make the eyes and bottom lip appear in the same location on each image for cropping. A deep neural network can be used to represent (or embed) the face on a hypersphere, in which the face is generically represented. Clustering, similarity detection, and classification tasks can be implemented to complete the facial recognition task. The facial recognition model can allow the associated processor to know the presence and location of the driver's eyes in the real-time captured image. The processor can be calibrated or pre-trained to associate a certain eye location within the image data with a corresponding pixel (or group of pixels) in the visor screen 24 that, when turned opaque, will block out the incident light or direct sunlight from the helmet wearer's eyes. This calibration may also take into account the location of the sun. For example, the calibration of the system may receive, as inputs, the location of the incident light (e.g., as detected from the light sensor 18) and the location of the detected eyes of the helmet wearer, and may command a corresponding region of the visor screen 24 to transition to the opaque state such that the incident light is blocked from traveling directly to the wearer's eyes.

Once the selected pixels are turned opaque to cast a shadow on the wearer's face, the camera 40 or other sensor can detect the presence of the shadow on the driver's face to assure the shadow aligns with the detected location of the wearer's eyes.

The above description of a facial recognition model to detect the presence and location of helmet wearer's eyes is but one example. Other facial recognition models exist and can be implemented to perform similar functions of detecting the location of the wearer's eyes, the location and intensity of the incident light, and darkening a corresponding region of the visor screen 24 such that the incident light can pass through the screen 24 at locations other than those that would travel directly to the wearer's eyes.

Instead of, or in addition to, the camera 40, a thermal sensor may be utilized. In such an embodiment, the thermal camera can detect heat coming from the wearer's head, and a corresponding control algorithm or machine learning system can detect the presence and location of the wearer's head, along with the presence and location of the wearer's eyes based on the heat signatures from the thermal camera.

As described herein, the control of the digital visor screen 24, including the selection of pixels for darkening and the amount of darkening, can be commanded by the controller 20 based on several inputs. In one embodiment, the light sensor 18 is the only sensor that provides input to the controller 20. In other embodiments, one or more other sensors may be provided, including an inward camera 40, outward camera 42, eye tracker 44, and the like.

Figure 4A:
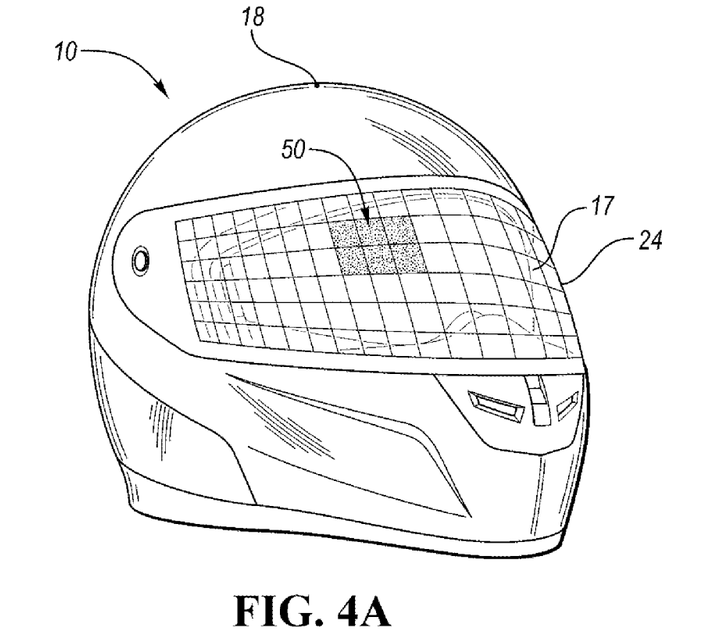
FIG. 4A is a perspective view of a helmet having a digital visor with a region of the visor controlled in an opaque state according to one embodiment in which the digital visor is folded down in front of the wearer's eyes.
Figure 4B:
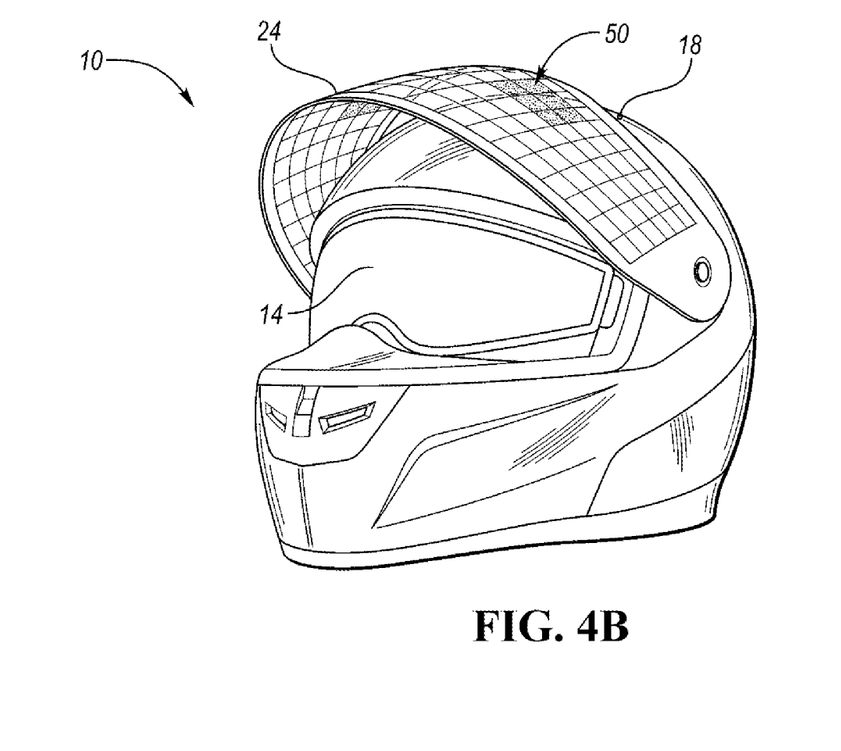
FIG. 4B is a perspective view of the helmet of FIG. 4A with the digital visor folded up and away from covering the wearer's eyes.

FIGS. 4A-4B show an embodiment of the helmet 10 with some of the pixels 17 selected for darkening. In this embodiment, the helmet 10 includes a light sensor 18 as described above (e.g., configured to detect the direction and intensity of incident light), and no other sensors providing input to the controller 20 for controlling the visor 24. However, in other embodiments such sensors are provided as described above.

Referring to FIGS. 4A-4B, FIG. 4A shows the helmet 10 with the visor (e.g., with digital visor screen 24) folded down to cover the eyes of the wearer and FIG. 4B shows the digital visor screen 24 folded up to expose the underlying face shield 14 or opening where the wearer's eyes are exposed. Once again, the visor screen 24 is shown with grid of LCD pixels 17, which are enlarged for illustrative purposes. The controller 20 (not shown) may be located within the helmet 10. A subset or group 50 of pixels has been selected by the controller 20 to be darkened, or transitioned to the opaque mode. The remaining pixels 17 outside the group 50 are not darkened, or are in the transparent mode.

The group 50 of pixels may be commanded to darken by the controller 20 based on the output signals from the light sensor 18. For example, the light sensor 18 may detect incident light originating from the sun. The light sensor 18 can detect the angle or direction of the incident light according to the embodiments described above. The light sensor 18 can also detect the magnitude or brightness of the incident light. If the light sensor 18 detects the incident light being straight ahead of the helmet, the controller 20 may select a certain group of pixels to darken that would shade the wearer's eyes from the direct sunlight—in this case the group 50 of pixels directly in front of where the wearer's eyes are. The remaining pixels 17 can remain transparent so as to not interfere with the field of view. This casts a shadow and blocks light over a location only where necessary.

In other embodiments, the group of pixels selected for darkening is located on one side of the visor screen 24. For example, if the incident light is detected as being approximately 45 degrees to the right of the direction that the helmet is facing, the group of pixels selected for darkening may all be located on the right-hand side of the visor screen 24 (from the perspective of the helmet wearer), and none of the pixels 17 on the left-hand side of the visor screen 24 are darkened.

The light sensor 18 may detect both a horizontal and vertical angle (i.e., a longitudinal and latitudinal direction) of the incident light, and darken a corresponding group of pixels that relates to the detected angle or location. Therefore, as the relative angle of the incident light changes, so do the pixels that are darkened. For example, if the helmet wearer were to turn the motorcycle, or turn his or her head, the light sensor 18 would detect a different location of the sun and would correspondingly change the group of pixels 17 that are darkened. As an illustrative example, if the sun is detected as being slightly to the left of the helmet, a group of pixels located slightly left of center (from the perspective of the helmet wearer) may be selected by the controller 20 and commanded to be in the opaque mode. If the helmet wearer turns his or hear head 90 degrees to the left, the sun would then be detected as being to the right of the helmet. Thus, the controller 20 would alter the visor screen 24 such that the pixels on the left side of the visor (from the perspective of the helmet wearer) are transparent and instead a group of pixels on the right side of the visor screen 24 would transition to the opaque mode.

The helmet 10 may be calibrated such that a given angle of incident light causes a corresponding pre-determined group of pixels 17 to darken. This may be stored in memory 22. A look-up table, for example, may be stored in memory that causes the controller or processor 20 to transition a certain group of pixels 17 to the opaque mode based upon the detected angle of incident of the ambient light.

Figure 5A:
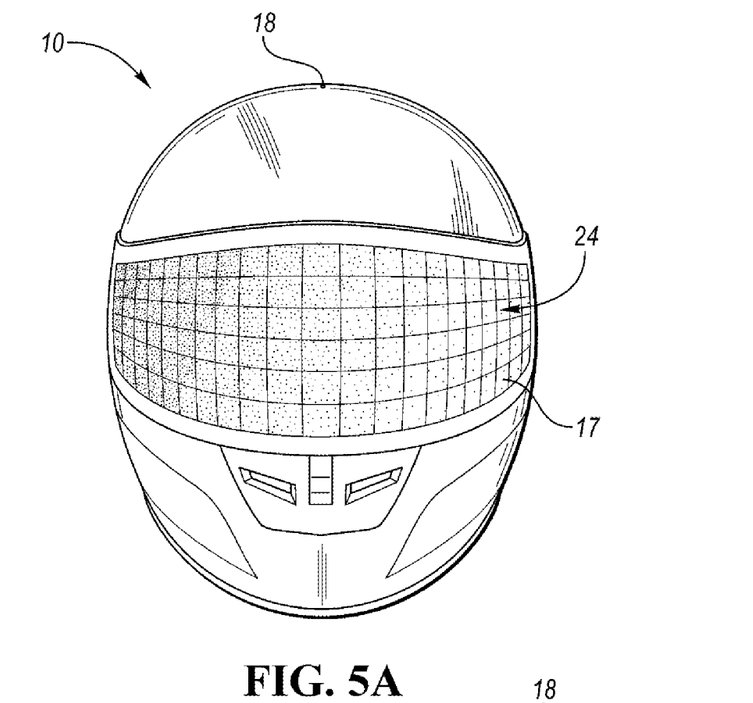
FIG. 5A is a front view of a helmet having a digital visor controlled to assume a gradient pattern in its transparency based on a detected location of incident light, according to one embodiment.
Figure 5B:
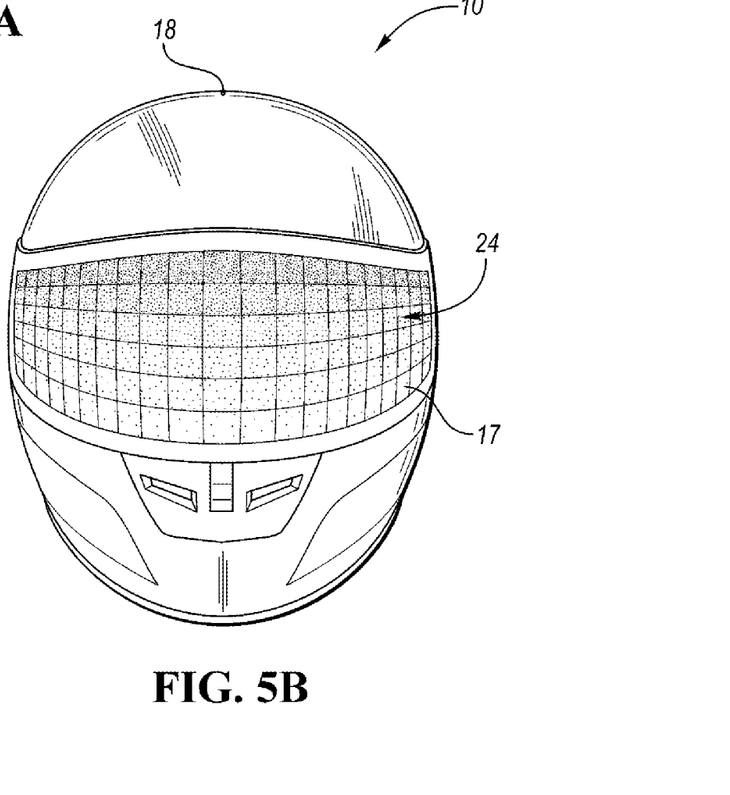
FIG. 5B is a front view of a helmet having a digital visor controlled to assume a gradient pattern in its transparency based on a detected location of incident light, according to another embodiment.

The visor screen 24 may also be controlled to assume a gradient pattern, in which more pixels are darkened in an area closest to the direction of incident light, and less pixels are darkened in a direction away from the direction of incident light. In other words, the darkened nature of the visor screen 24 is most intense in a desired location, and fades away in a direction away from that desired location. The desired location may be based on the direction of incident light as detected by the light sensor 18.

Referring to FIG. 5A, the light sensor 18 detects the incident light coming from the right side of the helmet (from the perspective of the helmet wearer). Based on this detected direction of incident light, the controller 20 commands various pixels at the right side of the visor screen 24 (from the perspective of the helmet wearer) to assume the opaque state, while more and more pixels are in the transparent state relative to a direction away from the right side of the helmet. Once again, as the helmet turns relative to the incident light which changes the detected direction of the incident light, the gradient pattern can correspondingly change such that the most concentrated region of pixels in the opaque state align with the detected direction of incident light relative to the helmet.

Referring to FIG. 5B, the light sensor 18 detects the incident light coming from above the helmet. Based on this detected direction of incident light, the controller 20 commands various pixels at the upper side of the visor screen 24 (from the perspective of the helmet wearer) to assume the opaque state, while more and more pixels are in the transparent state toward the bottom of the visor screen 24.

The controller 20 can also be programmed to increase the number of pixels in the opaque state, or increase the darkness of the pixels, in response to the intensity of the incident light. As explained above, the light sensor 18 has the capabilities to determine the intensity or magnitude (e.g., brightness) of the incident light. Based on the detected intensity of the incident light, the controller can darken the digital visor screen 24 accordingly. For example, in one embodiment, the controller may be programmed to increase the darkness of a first subset of pixels in response to a magnitude of the incident light exceeding a first threshold (e.g., 50 lumens), and increase the darkness of a second subset of pixels in response to the magnitude of incident light exceeding a second threshold (e.g., 80 lumens) greater than the first threshold. In other words, the brighter the incident light, the more pixels can be controlled to be opaque. In another embodiment, the pixels can be controlled between 0% and 100% opaqueness, and so the amount of opaqueness of any given pixel can fluctuate based on the brightness of the incident light. In other words, the brighter the incident light, the more opaque the already-opaque pixels can be controlled to be.

A mapping between the intensity of the incident light and the darkening levels (e.g., first and second thresholds) can be made. For example, the mapping can be built based on the data collected in real-life scenarios. When different users wear the helmet in different outdoor environments, the darkening levels can be manually changed and user feedback can be recorded. The mapping function can be estimated be statistical learning-based methods. The mapping function can provide the default darkening thresholds. For example, the median or mean amount of brightness that should trigger a darkening feature can be stored in the memory as the first threshold. The helmet wearer can further manually adjust the threshold to obtain a personalized configuration.

The teachings of darkening the visor screen 24 based on the brightness of the incident light can be combined with the selection of the group(s) of pixels 17 to darken. Since the light sensor 18 can detect both the magnitude and the direction of the incident light, the controller 20 can correspondingly (i) select one or more pixels to transition from transparent to opaque based on the direction of the incident light, and (ii) select a target opaqueness of the selected pixels that are opaque based on the brightness of the incident light.

Figure 6:
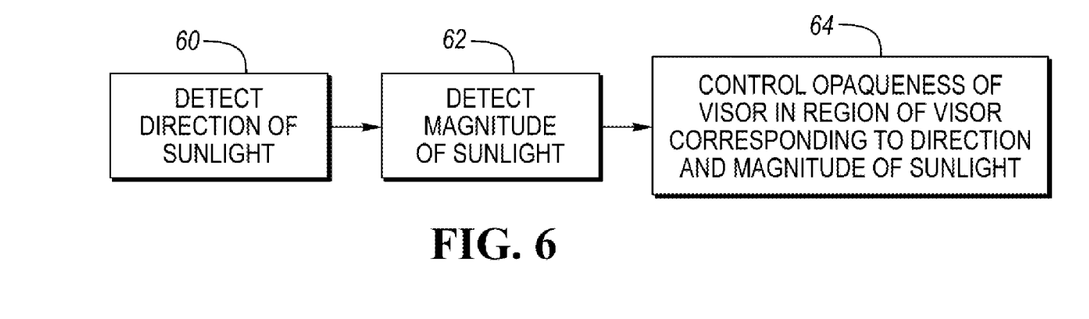
FIG. 6 is a flow diagram illustrating a control of a digital visor according to one embodiment.

FIG. 6 shows a flow diagram illustrating a control of a digital visor screen according to one embodiment. This flow diagram may be a method for controlling the visor screen, carried out by the processor 20 upon receiving input from the ambient light sensor 18 and acting upon instructions stored in the memory 22.

At 60, the light sensor 18 detects a direction of incident light, e.g., sunlight. At 62, the light sensor 18 detects a magnitude of the incident light. This may be performed simultaneously with step 60, based upon the structural characteristics of the light sensor 18. Of course, in some embodiments, the helmet has a dedicated sensor configured to detect the direction of the incident light, and another dedicated sensor configured to detect the magnitude of the incident light; both functions can be performed separately or by a single sensor.

At 64, the controller 20 controls the opaqueness of the visor screen 24 in a region of the visor screen 24 that corresponds to the direction of the incident light, and by a darkness that corresponds with the magnitude (e.g., brightness) of the incident light. Here, the controller 20 can select a group based on the detected direction of the incident light, and transition the pixels of that group from a transparent state to an opaque state. The group can be predetermined and stored in memory (e.g., a look-up table or the like) such that a given detected direction of the incident light yields a corresponding group of pixels for the transition to opaque. For example, if the sun is to the left of the helmet wearer, a group of pixels on the left-hand side of the visor screen 24 may be selected for transition to opaqueness to block the sun. Moreover, depending on the brightness of the incident light as detected from the light sensor 18, the controller may adjust the level of opaqueness of the group of pixels, or may increase the number of pixels (e.g., density) transitioned to opaqueness.

Figure 7:
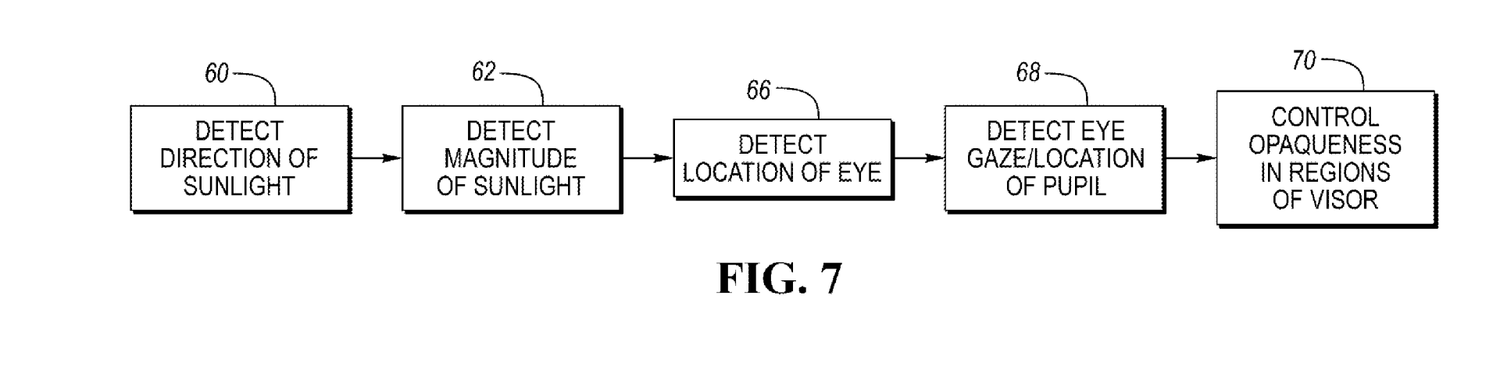
FIG. 7 is a flow diagram illustrating a control of a digital visor according to another embodiment.

FIG. 7 shows a flow diagram illustrating a control of a digital visor screen according to another embodiment. Once again, the direction of incident light and magnitude (e.g., brightness) of the incident light is determined at 60 and 62 as described above. At 66, a location of at least one eye of the helmet wearer is detected. This can be performed by the inward camera 40, as described above. For example, the inward camera 40 can detect the location, position, depth, and other physical characteristics of the eye(s) of the wearer.

At 68, an eye gaze and/or location of the pupil of the eye(s) is detected. This can be performed by the inward camera 40 or the eye tracker 44 feature described above. The associated sensors configured to determine the eye gaze can detect the direction that the helmet wearer is looking, utilizing the teachings of the eye tracker 44 described above as one example. Then, at 70, the controller 20 controls the opaqueness of certain pixels in selected regions of the visor screen 24. In other words, the controller selects pixels to adjust in opaqueness (and controls the amount of opaqueness) based on the direction of the incident light, the magnitude of the incident light, the location of the eye, the eye gaze (e.g., the direction the wearer is looking). The selected pixels for darkening can correspond with a direction the wearer is looking. For example, if the wearer is gazing or looking toward the left, then a corresponding group of pixels on the left-hand side of the visor screen 24 may darken; as the wearer gazes or looks toward the right, the group of darkened pixels can shift to the right, such that pixels on the left of the visor screen transition from opaque to transparent.

It should be noted that the digital visor screen 24 may, in some embodiments, only be actively controlled when the detected incident light is above a certain brightness threshold. This may be for safety reasons. If the environment is not very bright and there is no detected incident light that exceeds a given brightness threshold, then the entire digital visor screen 24 may assume a transparent state. The visor screen 24 may maintain this fully transparent state until an incident light is detected as exceeding the threshold.

The sensors described herein (e.g., light sensor 18, outward camera 42) have been described as being part of the helmet, but these sensors can alternatively be mounted or part of the motorcycle (or vehicle that is being operated). If placed on the motorcycle, the sensors can be configured to communicate with the controller 20 of the helmet. The signals output by these sensors can be transferred to the controller 20 wirelessly, via wireless transceivers for example.

In some embodiments, the visor screen 24 can be configured such that the entire screen is controlled to darken and lighten in unison. For example, the controller 20 can be configured to transition all of the pixels of the visor screen 24 from the transparent state to the opaque state. This may reduce the computational resources necessary, and may increase the response time of the helmet. This may also remove the need for detecting a direction of the incident light, instead only relying on the magnitude of the incident light as the controlling input; the controller can be configured to darken all of the pixels of the visor screen 24 by an amount proportional to the brightness of the incident light.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A helmet comprising:
a visor screen having a plurality of liquid crystal display (LCD) pixels, each LCD pixel configured to alter in transparency;
a light sensor configured to detect incident light; and
a controller coupled to the visor screen and the light sensor, the controller configured to alter the transparency of the plurality of LCD pixels based on the incident light, wherein the controller includes a processor and memory coupled to the processor;
wherein the memory includes instruction that the processor executes to:

darken a first subset of the LCD pixels in response to a magnitude of the incident light exceeding a first threshold, and in response to the magnitude of the incident light exceeding a second threshold, increasing a number of darkened LCD pixels by darkening a second subset of the LCD pixels.

2. The helmet of claim 1, wherein the instructions further cause the processor to:

determine a direction of the incident light via the light sensor, and alter the transparency of a subset of the plurality of LCD pixels, wherein the subset is selected based on the determined direction of the incident light.

3. The helmet of claim 1, wherein the instructions further cause the processor to:

determine a location of the incident light via the light sensor, and alter the transparency of the plurality of LCD pixels such that the first subset of LCD pixels are less transparent than of the second subset of LCD pixels, wherein the first subset is located closer than the second subset to the detected location of the incident light.

4. The helmet of claim 1, wherein the instructions further cause the processor to:

determine a direction of the incident light via the light sensor, and transition the visor screen to assume a gradient pattern with some of the LCD pixels being more opaque than other LCD pixels, wherein the gradient pattern is based on the determined direction of the incident light.

5. The helmet of claim 1, further comprising a camera configured to capture images of eyes of a rider wearing the helmet, wherein the controller is configured to determine a location of the eyes of the rider and a direction of the incident light, and wherein the controller is configured to select a subset of LCD pixels and reduce the transparency of the subset of the LCD pixels, wherein the selection of the subset of LCD pixels is based on the determined location of the eyes and the determined direction of the incident light.

6. A system for controlling an electronic visor screen of a helmet, the system comprising:

a visor screen configured to shield eyes of a helmet wearer, the visor screen having a plurality of liquid crystal display (LCD) pixels, each LCD pixel configured to (i) in an opaque state, block light from passing through a corresponding area of the visor screen, and (ii) in a transparent state, allow light to pass through the corresponding area of the visor screen;

a light sensor configured to mount to a helmet and detect a direction of incident light; and a controller configured to transition a group of the LCD pixels from the transparent state to the opaque state, wherein the group is selected for the transition by the controller based on the direction of incident light, and wherein the controller is configured to set the LCD pixels in the group to a pre-stored transparency pattern with varying transparencies levels within the group, wherein the pre-stored transparency pattern is based on the direction of the incident light.

7. The system of claim 6, wherein the controller is configured to set the LCD pixels in the group to a uniform transparency level between fully transparent and fully opaque.

8. The system of claim 6, wherein the light sensor is configured to detect an intensity of the incident light, and the controller is configured to set the group of LCD pixels at a transparency level based on the intensity of the incident light.

9. The system of claim 6, further comprising a camera configured to mount to the helmet and detect a location of the eyes of the helmet wearer, wherein the group is selected for the transition based on the location of the eyes.

10. The helmet of claim 1, wherein the helmet includes a shell configured to protect a head of a wearer, and wherein the visor screen is part of a visor that is configured to pivot relative to the shell.

* * * * *